United States Patent [19]
Pouget

[11] 4,233,521
[45] Nov. 11, 1980

[54] ELECTRIC INERTIA-TYPE STARTER DEVICE FOR A HEAT ENGINE

[75] Inventor: Rene Pouget, Levallois, France

[73] Assignee: Aciers et Outillage Peugeot, Audincourt, France

[21] Appl. No.: 882,465

[22] Filed: Mar. 1, 1978

[30] Foreign Application Priority Data

Mar. 2, 1977 [FR] France ................................ 77 06080

[51] Int. Cl.³ .............................................. H02K 7/00
[52] U.S. Cl. ..................................... 290/38 B; 310/74
[58] Field of Search ..................... 290/38, 38 A, 38 B; 310/290, 74, 78

[56] References Cited

U.S. PATENT DOCUMENTS

| | | | |
|---|---|---|---|
| 1,511,491 | 10/1924 | Aspden | 290/38 B |
| 1,511,492 | 10/1924 | Aspden | 290/38 B |
| 1,926,029 | 9/1933 | Bowes | 290/38 B |
| 4,180,743 | 12/1979 | Lacroix | 290/38 B |

FOREIGN PATENT DOCUMENTS 1065861  1/1954  France .................................. 290/38 B Primary Examiner—B. Dobeck
Attorney, Agent, or Firm—Sughrue, Rothwell, Mion, Zinn and Macpeak

[57] ABSTRACT

The device comprises an electric motor having a planar airgap the rotor of which constitutes a flywheel capable of being coupled frictionally with a plate rigid with the shaft of the heat engine to be started. For this purpose, the motor is axially movably mounted in a case between an uncoupled position to which it is biased by a spring and a position in which it is coupled with the plate. The motor is brought to the latter position by the excitation of a clutch coil carried by the rotor and exerting a force of attraction between the rotor and the plate in opposition to the action of the spring. Owing to its small axial overall size, this device requires only a low electric power and may be adapted to mopeds.

13 Claims, 3 Drawing Figures

ELECTRIC INERTIA-TYPE STARTER DEVICE FOR A HEAT ENGINE

The present invention relates to electric starter devices for heat engines and more particularly to those of the inertia type.

The starting of heat engines by electric starters is well known and employed in particular in all automobile engines. It comprises temporarily driving the heat engine by an electric motor through a mechanical speed ratio reducing means. In this case, the power to be supplied during a short time is high since the speed of rotation must be sufficient to start the heat engine and the resisting torque to be overcome is high owing to the compression in the cylinders. Consequently, a high electric power is required for driving the starter and a battery of sufficient capacity is needed for this purpose.

Although a satisfactory solution has been found for automobile engines, this is not so in the case of small engines, such as for example the engines of mopeds, marine engines of small power, the engines for agricultural appliances of the lawn-mower, log-sawing type etc., since in these cases the required battery and the starter itself would be of prohibitive size, weight and cost for the envisaged application.

The French Certificate of Addition N° 63 764 discloses an electric inertia-type starter device for a heat engine which partly overcomes these drawbacks. This device comprises an electric motor having a slidable rotor rigid with a flywheel which has a high mechanical inertia and carries a coil whereby it may be coupled with a plate rigid with the shaft of the heat engine. In order to start the latter, the flywheel is progressively driven in rotation by the electric motor and, when a sufficient speed has been reached, the flywheel is coupled with the plate, which has for effect to rotate the heat engine and start if after which the flywheel is uncoupled from the plate.

The energy to be supplied to the heat engine to start it is of course the same as in the case of a conventional starter, but owing to the accumulation of energy in the flywheel, the electric power required is much lower since it is spread over a much longer period of time. In this way, an electric battery of very small capacity is sufficient, which battery is provided on a moped for the operation of the blinker indicator lights.

However, it has not been possible to generalize the use of the electric starter devices of the type disclosed in said French Certificate of Addition up to the present time owing to their excessive axial size resulting from the presence of an electric motor coupled with a flywheel. In particular, in the case of mopeds, this axial size is unacceptable since it could prevent the rotation of the pedals.

An object of the invention is to provide an electric inertia-type starter device having a reduced axial overall size, in particular to enable it to be used easily on mopeds or the like.

According to the invention, there is provided an electric inertia-type starter device for a heat engine, comprising an electric motor, a flywheel having a high mechanical inertia driven by the electric motor, a member connected to rotate with the shaft of the heat engine, and clutch means for temporarily coupling the flywheel with said member, wherein the electric motor has a planar airgap and a rotor which constitutes said flywheel.

Further features and advantages of the invention will be apparent from the ensuing description with reference to the accompanying drawing, given solely by way of example and in which.

Figure 1:
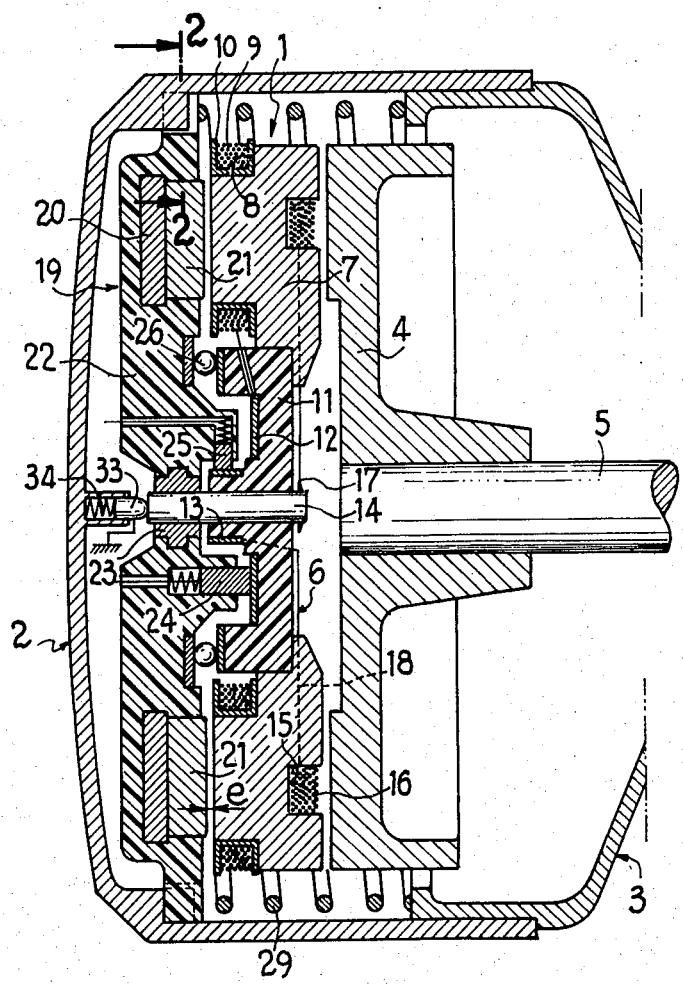
FIG. 1 is a diametral sectional view of an electric inertia-type starter device for a heat engine according to the invention.
Figure 2:
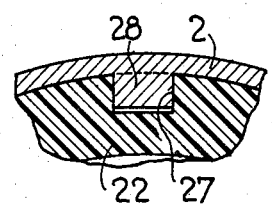
FIG. 2 is a detail sectional view taken on line 2—2 of FIG. 1.
Figure 3:
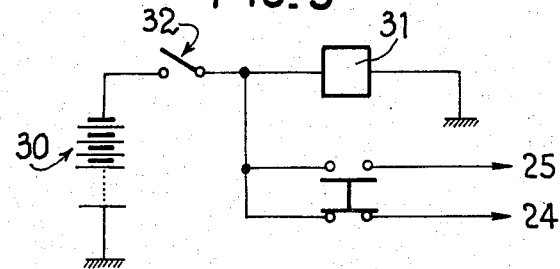
FIG. 3 is a diagram of an electric supply circuit for the electric motor of the starter device shown in FIG. 1.

With reference to the drawing, there is shown an electric motor 1 which has a planar airgap and is disposed in a cap 2, closing a case 3, in facing relation to a plate 4 of a magnetizable material connected to rotate with the end of a shaft 5 of a heat engine (not shown). The rotor 6 of this motor, which constitutes a flywheel having a high mechanical inertia, comprises an induced magnetic circuit 7 formed by a ring of magnetic metal having low hysteresis and eddy currents losses, for example of laminated metal or other material having the same performances. This magnetic circuit 7 comprises a number of radial and circumferential grooves 8 in which are disposed the coils or windings 9 wound on frames 10. It will be understood that any suitable type of winding may be employed, the winding of such a motor being the transposition in a plane of the winding on a cylinder of a conventional drum-armature motor. The magnetic circuit 7 is rigid with a hub 11 of insulating material which carries a flat commutator 12, a conducting ring 13 the purpose of which will be explained hereinafter, and a shaft 14 to which it is fixed. Formed in the magnetic circuit 7 is a circular groove 15 in which a coil 16 is disposed for ensuring the electromagnetic sticking of the rotor 6 against the plate 4 when the heat engine is to be started, this constituting a friction clutch. This coil 16 is connected to the shaft 14 by a conductor 17 and to the ring 13 by a conductor 18.

The stator 19 forming the field magnet or inductor comprises a ring 20 of ferromagnetic metal on which magnets 21 are disposed. The assembly is covered by a member 22 of insulating material which supports a bearing 23 through which the shaft 14 extends. This centres the armature 6 relative to the field magnet 19. Also formed in the member 22 of insulating material are axial cavities receiving the brushes 24 which are biased by springs against the segments of the commutator 12, and a radial cavity receiving a brush 25 which is biased by a spring against the conductive ring 13. A thrust ball bearing 26 disposed between the stator 19 and the rotor 6 positions them axially and guarantees the obtainment of an airgap e, which is of suitable size and even throughout the periphery, the magnetic force exerted by the magnets 21 on the magnetic surface 7 of the armature 6 maintaining relative positions of the rotor and the stator and preventing their separation. The insulating member 22 is centered in the cap 2 closing the end of the case 3, but it is axially slidable in this cap 2. However, it is prevented from rotating since it has on its periphery notches 27 in which bosses 28 of the cap 2 are engaged. The insulating member 22 is maintained against the cap 2 by the effect of a spring 29 which bears against the case 3.

The brushes 24 and 25 are supplied with current by a supply battery 30 through a delay relay 31 having two moving contacts are controlled by a main switch 32. Further, the circuit of the clutch coil 16 is closed by the shaft 14 through a rotating contact 33 which is biased against the shaft 14 by a spring 34 bearing against the end of the cap 2. In the position of rest of the relay 31 and with the switch 32 closed, the battery 30 supplies current to the brushes 24 and thence to the windings 9. At the end of a predetermined period of time after the closure of the switch 32, the relay is actuated and this opens the supply circuit of the brushes 24 and closes that of the brush 25. When the switch 32 is opened, none of the brushes is supplied with current.

The starter device just described operates in the following manner:

When it is desired to start the heat engine, the electric motor 1 is supplied with current by closing the switch 32 which supplies current to the brushes 24 and rotates the armature 6. The speed of rotation of the latter gradually increases and at the end of a predetermined period of time, which is so calculated that the speed of rotation of the armature 6 is sufficient, the supply of current to the motor is cut off by the delay relay 31 which at the same time ensures the excitation of the coil 16 and causes the rotor 6 to stick against the plate 4 by the axial displacement of the whole of the motor 1 in opposition to the compression of the spring 29. Note that the force of compression of the spring 29 is less than the magnetic force of the magnets 21 of the stator 19 which act on the magnetic circuit 7 of the armature 6 so that the motor 1 is moved bodily and there is no widening of the airgap e. The sticking of the rotor 6 against the plate 4 drives the latter by the effect of friction and consequently the shaft 5 of the heat engine is driven in rotation so that the heat engine is started at the end of a few instants. The current is then cut off in the coil 16 by the switch 32 and the electric motor 1 returns to its rear position of abutment against the cap 2 under the effect of the spring 29.

By way of example, to start a 50 cc two-stroke petrol engine there was employed an electric motor having a flat airgap and six poles comprising seven non-imbricated sections, a commutator having seven segments, and a rotor having a moment of inertia of $14.6 \times 10^{-4}$ kg.sq.m., the current being supplied by a 6 volts - 1 ampere/hour battery. With such an arrangement, the electric motor takes two seconds to reach the speed of 2,700 rpm and the maximum current produced is 20 amps. Upon the starting of the heat engine, the speed of rotation of the armature at the moment of the unsticking of the plate is 1,800 rpm.

It is found therefore that the starter device according to the invention requires no source of electric energy other than that already provided on mopeds for the operation of the blinker indicator lights and that the axial overall size of the assembly is particularly small owing to the fact that it concerns a very flat motor and the flywheel is formed by the rotor itself.

It will be understood that many modifications may be made in the described embodiment without departing from the scope of the invention defined in the accompanying claims. Examples of some of these modifications will now be given.

The electromagnetic clutch device formed by the coil 16 and the magnetic masses 4, 7 may be replaced by a mechanical or pneumatic device ensuring the axial displacement of the electric motor 1 and the contact of the rotor 6 with the plate 4. Further, in the case of an electromagnetic clutch, the single coil 16 may be replaced by a plurality of coils connected in series or in parallel and evenly arranged on the face of the rotor 6 confronting the plate 4. By way of a modification, the clutch coil or coils could be carried by the plate 4 by providing suitable electric supply means on the latter. Further, the commutator 12 could be cylindrical instead of planar, and the ring 13 could be planar instead of cylindrical.

The mechanical device comprising the shaft 14, the bearing 23 and the thrust ball bearing 26 could also be replaced by any other suitable device relatively centering the stator 19 and rotor 6 and maintaining a constant airgap e between these two parts. The coil spring 29 disposed between the case 3 and the insulating member 22 could also be replaced by blade springs or any other spring device performing the same function.

Note that the functions of the stator 19 and rotor 6 may be inverted, the armature becoming fixed and the field magnet rotatable. Of course, in this case, a supply of current through rotating rings is necessary to supply the current to the brushes unless the motor provided has no commutator but an electronic commutation. The clutch coil or coils must then be carried either by the plate or by the field magnet.

Having now described my invention what I claim as new and desire to secure by Letters Patent is:

1. An electric inertia-type starter device for a heat engine, comprising an electric motor including a stator and a rotor which define therebetween a planar airgap, said rotor having a high mechanical inertia and acting as a flywheel, a member for connection to the driving shaft of the heat engine, and releasable clutch means for temporarily coupling the rotor to said member, said rotor having an outside diameter substantially equal to the outside diameter of said member.

2. A device as claimed in claim 1, wherein the rotor and the stator of the electric motor are connected to move together in translation between a coupled position and an uncoupled position of the rotor relative to said member.

3. A device as claimed in claim 2, comprising elastically yieldable means for biasing the stator to said uncoupled position.

4. A device as claimed in claim 3, wherein the stator of the electric motor is of the type having permanent magnets and the rotor is an armature comprising a magnetic circuit producing a force of attraction between the magnets and the magnetic circuit, said force of attraction and a force exerted by the clutch means between the rotor and said member being adapted to each overcome the biasing force exerted by said elastically yieldable means.

5. An electric inertia-type starter device for a heat engine, comprising an electric motor including a stator and a rotor which define therebetween a planar airgap, the rotor having a high mechanical inertia and acting as a flywheel, a member for connection to the driving shaft of the heat engine, and releasable clutch means for temporarily coupling the rotor to said member, the rotor and the stator of the electric motor being connected to move together between a coupled position and a uncoupled position of the rotor relative to said member, elastically yieldable means for biasing the stator to said uncoupled position, and a thrust ball bearing disposed between the rotor and the stator for maintaining the value of the airgap constant, the stator of the electric motor being of the type having permanent magnets and the rotor being an armature comprising a magnetic circuit producing a force of attraction between the magnets and the magnetic circuit, said force of attraction and a force exerted by the clutch means between the rotor and said member being adapted to each overcome the biasing force exerted by said elastically yieldable means.

6. A device as claimed in claim 3, comprising a case in which the electric motor and said member are mounted, the elastically yieldable means comprising a coil spring disposed around the rotor and bearing against the stator and a fixed part of the case.

7. A device as claimed in claim 5, wherein the stator has a periphery defining at least one notch and the case comprises at least one boss engaged in the notch for preventing rotation of the stator but allowing an axial displacement of the stator.

8. A device as claimed in claim 1, wherein the rotor and said member are at least partly of a magnetizable material, one of the elements consisting of said member and the rotor carrying at least one electric clutch coil on the face thereof facing the other element.

9. An electric inertia-type starter device for a heat engine, comprising an electric motor including a stator and a rotor which define therebetween a planar airgap, the rotor having a high mechanical inertia and acting as a flywheel, a member for connection to the driving shaft of the heat engine, releasable clutch means for temporarily coupling the rotor to said member, at least one electric clutch coil carried by a face of the rotor, a shaft on which the rotor is mounted to rotate with the shaft, an electric supply having two terminals, the rotor being at least partly magnetizable, and said member being at least partly magnetizable and having a face in confronting relation to the face of the rotor carrying the clutch coil, a first circuit comprising a rotatable contact connecting one of said terminals to said shaft on which the rotor is mounted, a brush mounted in the stator and connected to the other of said terminals, and a ring connected to rotate with the rotor and connected to one end of the clutch coil, another end of the clutch coil being connected to the shaft on which the rotor is mounted.

10. A device as claimed in claim 9, comprising an electric supply circuit for the motor and combined with said first circuit and including switching means for interrupting supply of current to the motor and applying voltage to the clutch coil.

11. A device as claimed in claim 10, wherein said switching means comprise delay means so as to apply said voltage to the clutch coil a predetermined period of time after the supply or current to the rotor.

12. A device as claimed in claim 1, wherein the stator of the motor constitutes the inductor and the rotor the armature of the motor.

13. An electric inertia-type starter device for a heat engine, comprising an electric motor including a stator and a rotor which define therebetween a planar airgap, said rotor having a high mechanical inertia and acting as a flywheel, a member for connection to the driving shaft of the heat engine, and releasable clutch means for temporarily coupling the rotor to said member, said rotor having an outside diameter substantially equal to the outside diameter of said member, said rotor being substantially disc-shaped and defining at one axial end thereof a first surface which defines said airgap with said stator, and defining at an axially opposite end thereof a second surface for engaging said member when said rotor is coupled with said member by said releasable clutch means.

* * * * *